(12) United States Patent
Farjoud et al.

(10) Patent No.: US 9,440,524 B2
(45) Date of Patent: Sep. 13, 2016

(54) MOUNT APPARATUS

(71) Applicant: BEIJINGWEST INDUSTRIES CO., LTD., Doudian Town, Fangshan District, Beijing (CN)

(72) Inventors: Alireza Farjoud, Beavercreek, OH (US); David John Barta, Beavercreek, OH (US); Brent Wade Fourman, New Paris, OH (US); Chad Michael, Kettering, OH (US); Eric Louis Schumann, Tipp City, OH (US)

(73) Assignee: BeijingWest Industries, Co., Ltd., Beijing (CN)

( * ) Notice: Subject to any disclaimer, the term of this patent is extended or adjusted under 35 U.S.C. 154(b) by 41 days.

(21) Appl. No.: 14/370,403

(22) PCT Filed: May 27, 2013

(86) PCT No.: PCT/CN2013/076265
§ 371 (c)(1),
(2) Date: Jul. 2, 2014

(87) PCT Pub. No.: WO2014/026495
PCT Pub. Date: Feb. 20, 2014

(65) Prior Publication Data
US 2014/0360799 A1   Dec. 11, 2014

Related U.S. Application Data

(60) Provisional application No. 61/683,408, filed on Aug. 15, 2012.

(51) Int. Cl.
*B60K 5/12* (2006.01)
*F16F 13/26* (2006.01)

(52) U.S. Cl.
CPC ............ *B60K 5/12* (2013.01); *F16F 13/26* (2013.01); *F16F 13/264* (2013.01)

(58) Field of Classification Search
CPC .......... B60K 5/12; F16F 13/26; F16F 13/10; F16F 13/105
USPC .................. 267/140.13, 140.14, 140.15
See application file for complete search history.

(56) References Cited

U.S. PATENT DOCUMENTS

| 4,660,812 A | 4/1987 | Dan et al. |
| 4,671,227 A | 6/1987 | Hollerweger et al. |

(Continued)

FOREIGN PATENT DOCUMENTS

| CN | 1715704 A | 1/2006 |
| EP | 0163817 A2 | 12/1985 |

(Continued)

OTHER PUBLICATIONS

International Search Report, Aug. 12, 2013, 4 pages.

(Continued)

*Primary Examiner* — Thomas J Williams
*Assistant Examiner* — Mariano Sy
(74) *Attorney, Agent, or Firm* — Dickinson Wright PLLC

(57) ABSTRACT

A mount apparatus (20) for supporting a vibration source on a base is provided. The mount apparatus (20) includes a moving member (134) that is partially disposed in a pumping chamber (64) for moving within the pumping chamber (64) along a first axis (A) to create a volume change in the pumping chamber (64) to maintain the volume of the pumping chamber (64) to prevent a pressure increase in the pumping chamber (64) during the deformation of a flexible body (46) in response to an external excitation to effectively cancel the external excitation. The moving member (134) includes a moveable wall (144) of a flexible material, having a generally hour glass-shape in steady state, and extending between moving member upper and lower ends (140, 142). The moveable wall (144) flexes radially outwardly and inwardly relative to the first axis (A) in response to relative axial movement between the moving member upper and lower ends (140, 142), to amplify the volume change in the pumping chamber (64).

21 Claims, 1 Drawing Sheet

(56) References Cited

U.S. PATENT DOCUMENTS

| | | | |
|---|---|---|---|
| 5,238,232 A | 8/1993 | Kobayashi et al. | |
| 5,356,123 A | 10/1994 | Hamada et al. | |
| 5,407,169 A * | 4/1995 | Tournier | F16F 13/26 248/562 |
| 5,439,204 A | 8/1995 | Yamazoe et al. | |
| 2003/0011117 A1* | 1/2003 | Nishi | F16F 13/268 267/140.14 |
| 2003/0030203 A1* | 2/2003 | Nemoto | F16F 13/26 267/140.14 |
| 2005/0017420 A1* | 1/2005 | Nemoto | B60K 5/1208 267/140.14 |
| 2005/0206056 A1* | 9/2005 | Maeno | F16F 13/106 167/140.13 |
| 2006/0220288 A1* | 10/2006 | Okumura | F16F 13/264 267/140.13 |
| 2009/0008845 A1* | 1/2009 | Tanaka | F16F 13/268 267/64.15 |
| 2009/0009009 A1* | 1/2009 | Kon | F16F 13/26 310/20 |
| 2012/0242020 A1* | 9/2012 | Muraoka | F16F 13/26 267/140.14 |
| 2013/0061743 A1* | 3/2013 | Lee | F16F 13/268 92/131 |
| 2013/0256960 A1* | 10/2013 | Marienfeld | F16F 13/10 267/140.14 |

FOREIGN PATENT DOCUMENTS

| | | |
|---|---|---|
| EP | 0536760 A1 | 4/1993 |
| JP | S6474334 A | 3/1898 |
| JP | 5324605 A | 3/1978 |
| JP | S5324605 | 3/1978 |
| JP | 56009679 A | 6/1981 |
| JP | 5713884 U | 1/1982 |
| JP | 4312229 | 4/1992 |
| JP | 0599264 A | 4/1993 |
| JP | 05172180 A | 7/1993 |
| JP | 06206450 A | 7/1994 |
| JP | 06310771 A | 11/1994 |
| JP | 06330980 A | 11/1994 |
| JP | 07139581 A | 5/1995 |
| JP | 1163088 A | 3/1999 |
| JP | 2001012537 A | 1/2001 |
| JP | 2010276189 A | 12/2010 |

OTHER PUBLICATIONS

Supplementary European Search Report; Dated Dec. 18, 2015; 8 Pages.

* cited by examiner

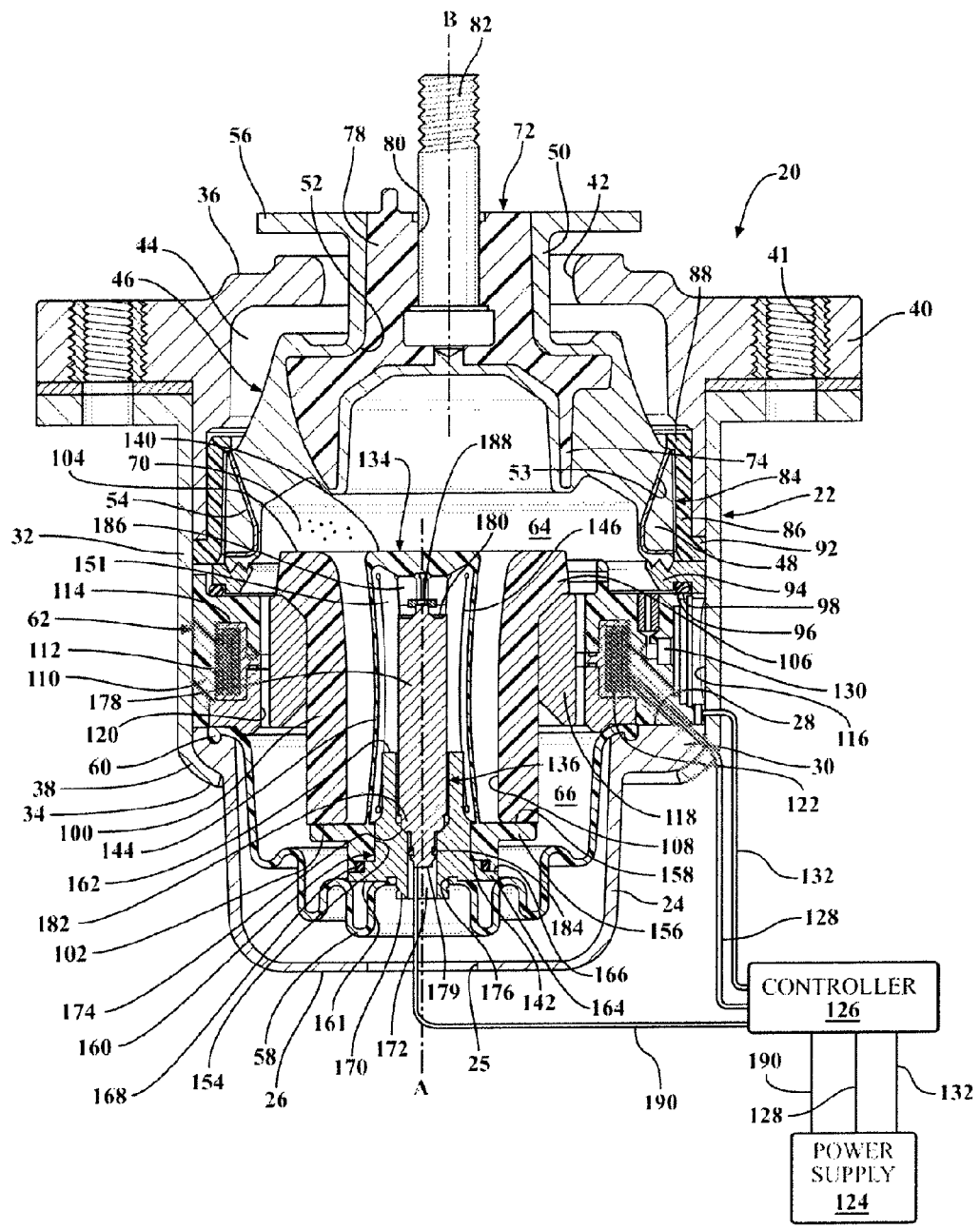

MOUNT APPARATUS

BACKGROUND OF THE INVENTION

1. Field of the Invention

The present invention relates to a mount apparatus for supporting a vibration source on a base, more particularly, to an active hydraulic mount apparatus.

2. Description of the Prior Art

Conventional mounts exist for supporting and providing vibration isolation of vibration sources. One well-known application of these mounts is for supporting components of automotive vehicles. These mounts typically operate to provide engine vibration isolation while also to control the motion of the engine and connected powertrain components with respect to the vehicle frame or body structure. In many applications of engine and powertrain mounts, it is desirable to vary damping characteristics of the mount to provide selective isolation of vibrations at certain frequencies.

One such hydraulic mount apparatus is disclosed in U.S. Pat. No. 5,439,204 to Yamazo et al. The mount includes a housing that extends about and along a first axis and defines a housing chamber. A flexible body made of an elastic material is disposed in the housing chamber to define a pumping chamber within the housing chamber that is configured to be filled with a fluid. The pumping chamber is interconnected with the housing for deforming elastically in response to movement of a vibration source relative to the housing caused by an external excitation. A moving member is partially disposed in the pumping chamber for moving within the pumping chamber. An actuator is operatively coupled to the moving member for moving the moving member to create a volume change in the pumping chamber to maintain the volume of the pumping chamber to prevent a pressure increase in the pumping chamber during the deformation of the flexible body in response to the external excitation to effectively cancel the external excitation.

A known problem with such mount apparatuses is that the commonly piston-shaped moving members have an unfavorable surface area ratio compared to the surface area of the flexible body, thus requiring a relatively large stroke of the actuator relative to the displacement of the flexible body in order to effectively cancel the external excitation.

SUMMARY OF THE INVENTION

The invention provides for such a mount apparatus for supporting a vibration source on a base. The hydraulic mount comprises a housing extending about and along a first axis and defining a housing chamber, a flexible body made of an elastic material at least partially disposed in the housing chamber to define a pumping chamber configured to be filled with a fluid within the housing chamber, the flexible body being interconnected with the housing for deforming elastically in response to movement of the vibration source relative to the housing caused by an external excitation, a moving member at least partially disposed in the pumping chamber for moving within the pumping chamber, and an actuator operatively coupled to the moving member for moving the moving member to create a volume change in the pumping chamber to maintain the volume of said pumping chamber to prevent a pressure increase in the pumping chamber during the deformation of the flexible body in response to the external excitation to effectively cancel the external excitation. The moving member includes an axially extending moveable wall of a flexible material and defines a moving member chamber for flexing radially outwardly and inwardly relative to the first axis to amplify the volume change in the pumping chamber.

Thus several advantages of one or more aspects of the invention are that the moveable wall provides for increased surface area of the moving member, therefore a smaller actuator stroke is required to effectively cancel the external excitation, while utilizing the limited radial space of the housing chamber. The increased surface of the moving member is particularly advantageous when used with actuators like piezostack actuators which have relatively short actuator strokes. Piezostack actuators are attractive for this application due to their very high response speed and frequency bandwidth

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is cross-sectional and schematic view of the mount apparatus.

DETAILED DESCRIPTION OF THE ENABLING EMBODIMENTS

Referring to FIG. 1, a hydraulic mount apparatus 20 is generally shown for supporting a vibration source on a base. In the enabling embodiment, the hydraulic mount apparatus 20 is used for supporting a component of an automobile (e.g. an engine) on the frame of an automotive vehicle. However, it should be appreciated that the mount apparatus could be used for supporting various other vibration sources on a base.

The hydraulic mount apparatus includes a housing 22 that includes a generally bowl-shaped lower housing portion 24 that extends annularly about and along a first axis A from a closed lower housing portion lower end 26 to an open lower housing portion upper end 28. The lower housing portion 24 defines a lower housing portion lip 30 that extends radially outwardly from the lower housing portion 24 adjacent the lower housing portion upper end 28. The lower housing portion lower end 26 further defines a lower housing portion bore 25 that extends through the lower housing portion 24 along the first axis A.

The housing 22 further includes a generally cup-shaped upper housing portion 32 that is disposed generally axially above the lower housing portion 24 and extends annularly about and along a second axis B parallel to the first axis A from an open upper housing portion lower end 34 to a closed upper housing portion upper end 36. It should be appreciated that the upper and lower housing portions 32, 24 could have other shapes (e.g. square or hexagonal cross-sections). The upper housing portion lower end 34 defines an upper housing portion lip 38 that extends radially inwardly from the upper housing portion lower end 34 and is disposed below and cooperates with the lower housing portion lip 30 to restrict axial movement of the upper and lower housing portions 32, 24 away from one another. The upper and lower housing portions 32, 24 define a housing chamber 44 therein.

The upper housing portion upper end 36 defines a mounting flange 40 that extends radially outwardly from the upper housing portion 32 adjacent the upper housing portion upper end 36. The mounting flange 40 defines a plurality of threaded mounting bores 41 that extend axially therethrough and are circumferentially spaced from one another along the mounting flange 40 for interconnecting the mount apparatus 20 with the base (i.e. the frame of the automotive vehicle in the enabling embodiment). The upper housing portion upper end 36 further defines an upper housing bore 42 extending therethrough along the second axis B.

A flexible body 46 made of an elastic material extends annularly about and axially along the second axis B from a generally frusto-conical-shaped flexible body lower portion 48 disposed in the housing chamber 44, through the upper housing bore 42, to a flexible body upper portion 50 outside of the housing chamber 44 for deforming elastically relative to the housing 22 in response to movement of the component relative to the automotive vehicle due to an external excitation (e.g. piston vibrations, engine rocking, road vibrations, etc.). The flexible body 46 defines a flexible body chamber 52 that extends axially into the flexible body 46 from the flexible body upper portion 50.

The flexible body lower portion 48 defines an insert member groove 53 extending annularly thereabout. The flexible body lower end further includes an outer insert member 54 having a generally C-shaped cross-section and made of a metal material disposed in the insert member groove 53 and extending annularly thereabout for providing rigidity to the flexible body 46. It should be appreciated that the insert member groove 53 and outer insert member 54 could have other shaped cross-sections to better provide rigidity of the flexible body lower portion 48 under different configurations of the mount apparatus 20. The flexible body upper portion 50 defines a flexible body flange 56 that extends radially outwardly therefrom for engaging the closed upper housing portion upper end 36 when the flexible body 46 deforms past a predetermined length. In other words, the flexible body flange 56 prevents the flexible body lower portion 48 from flexing past the point in which the flexible body flange 56 engages the upper housing portion upper end 36.

A generally disc-shaped diaphragm 58 made of an elastic material extends annularly about the first axis A and defines a diaphragm edge 60 sealingly disposed in the housing chamber 44 below the flexible body 46. A partition assembly 62 is disposed in the housing chamber 44 and extends annularly about and along the first axis A between the flexible body 46 and the diaphragm 58. The partition assembly 62 divides the housing chamber 44 into a pumping chamber 64 between the flexible body 46 and the partition assembly 62, and a receiving chamber 66 between the partition assembly 62 and the diaphragm 58. The volume of each of the chambers 64, 66 is changed by deformation of the flexible body 46 and the diaphragm 58 in response to the external excitation.

A magnetorheological fluid 70 is contained within the pumping and receiving chambers 64, 66. Magnetorheological fluid 70, as known in the art, is responsive to modify its shear properties. Specifically, it has the ability to reversibly change from a free-flowing, linear, viscous liquid to a semi-solid with controllable yield strength when exposed to a magnetic field.

An upper support member 72 made of a metal material and having a shape in conformance with the flexible body chamber 52 is disposed in the flexible body chamber 52 in engagement with and bonded to the flexible body 46 and extends annularly about the second axis B for restricting radially inward movement of the flexible body 46. The upper support member 72 further extends along the second axis B from an upper support member lower portion 74 inside the housing chamber 44, through the upper housing bore 42, to an upper support member upper portion 78 outside of the housing chamber 44. The upper support member 72 defines an upper support member passage 80 that extends therethrough along the second axis B.

A generally cylindrical-shaped and threaded first mounting member 82 is fixedly disposed in the upper support member passage 80 and extends annularly about and along the second axis B away from the upper support member 72 for threadedly engaging the vibration source (i.e. the engine of the vehicle in the enabling embodiment) to interconnect the vibration source and mount apparatus 20. It should be appreciated that the first mounting member 82 could have other shapes (e.g. square cross-section) and could be made of various high strength materials.

A reinforcing member 84 made of a metal material and having a generally Z-shaped cross section is disposed in the housing chamber 44 and extends annularly about the second axis B. The reinforcing member 84 defines a reinforcing member vertical portion 86 disposed radially between the upper housing portion 32 and the flexible body lower portion 48 for restricting movement of the flexible body lower portion 48 radially outwardly. The reinforcing member 84 further defines an upper reinforcing member horizontal portion 88 that extends radially inwardly toward and partially above the flexible body lower portion 48 from the reinforcing member vertical portion 86 for restricting movement of the flexible body lower portion 48 axially toward the upper housing portion upper end 36. The reinforcing member further defines a lower reinforcing member horizontal portion 92 that extends radially inwardly toward the upper housing portion 32 from the reinforcing member vertical portion 86.

The partition assembly 62 includes a generally cylindrical-shaped metal upper spacer 94 that extends annularly about the first axis A adjacent the upper housing portion 32 and axially below and in engagement with the flexible member body lower portion 48 and the reinforcing member 84. The upper spacer 94 defines at least one upper spacer groove segment 96 that extends annularly therealong. The reinforcing member 84 further defines a reinforcing member securing leg 98 that extends annularly form the reinforcing member vertical portion 86, spaced axially below the lower reinforcing member horizontal portion 92, and extends annularly through each of the upper spacer groove segments 96 for interconnecting the reinforcing member 84 and the upper spacer 94.

The partition assembly 62 further includes a generally cylindrical-shaped, metal lower support member 100 that extends annularly about and along the first axis A from a lower support member lower end 102 to a lower support member upper end 104. It should be appreciated that the lower support member 100 could be made of other high-strength materials and could have other shapes (e.g. square-shaped cross section). The lower support member 100 defines a lower support member flange 106 that extends radially away from the lower support member 100 adjacent the lower support member upper end 104. The lower support member 100 further defines a lower support member passage 108 that extends therethrough between the lower support member upper end 104 and the lower support member lower end 102 generally along the first axis A. It should be appreciated that the lower support member 100 and lower support member passage 108 could extend at angles slightly away from the first axis A.

The partition assembly 62 further includes a generally cylindrical-shaped, metal electromagnet support ring 110 that extends annularly about the first axis A and is disposed radially between the lower support member 100 and the upper housing portion 32 and axially between the upper spacer 94 and the lower housing portion lip 30. It should be appreciated that the electromagnet support ring could have other shapes (e.g. square-shaped cross section) and could be made of other magnetically permeable, high-strength materials. The electromagnet support ring 110 defines an electromagnet groove 112 that extends annularly thereabout. The diaphragm edge 60 is sealingly sandwiched axially between the electromagnet support ring 110 and the lower housing portion lip 30. A bobbin 114 that has a spool-shaped cross section is disposed in the electromagnet groove 112 and extends annularly thereabout. An electromagnet coil 122 is disposed in the electromagnet groove 112 and wrapped about the bobbin 114 for selectively generating a magnetic flux. It should be appreciated that more than one electromagnet coil 122 could be disposed about the bobbin 114. The partition assembly further includes a flux ring 118 comprised of a material having a high magnetic permeability disposed radially between the lower support member 100 and the electromagnet support ring 110, and axially below the lower support member flange 106 for concentrating a magnetic flux.

Additionally, the partition assembly 62 defines a main fluid passage 120 that extends axially between the pumping chamber 64 and the receiving chamber 66, and radially between the flux ring 118 and the electromagnet support ring 110, for passing the magnetorheological fluid 70 between the pumping and receiving chambers 64, 66 in response to the deformation of the flexible body 46 and the diaphragm 58. It should be appreciated that more than one main fluid passage 120 could be defined by the partition assembly 62 and the main fluid passage 120 could extend in variously shaped paths. To variably dampen vibrations at relatively low frequencies, typically at and less than approximately 20 Hz, such as those caused by road vibrations, the electromagnet coil 122 selectively generate a magnetic flux across the flux ring 118 and main fluid passage 120 to increase the shear resistance of the magnetorheological fluid 70 in the main fluid passage 120, thereby increasing the damping stiffness of the mount apparatus 20. In other words, by means of the magnetorheological damping components, the hydraulic mount apparatus 20 is adapted to isolate or dampen vibrations at a range of relatively low frequencies (i.e. around and less than 20 Hz). With regard to automobiles, this capability can optimize ride, comfort, and handling characteristics.

The mount apparatus 20 further includes a power supply 124 for supplying power to the mount apparatus 20, and a controller 126 for controlling the magnetic flux generated by the electromagnet coil 122. A plurality of electromagnet wires 128 extend through the upper housing portion 32 between the controller 126, the electromagnet coils 122, and the power supply 124 for electrically connecting the electromagnet coils 122, the controller 126 and the power supply 124.

The electromagnet support ring 110 further defines a sensor cavity 116 that is spaced radially outwardly from the electromagnet groove 112. A sensor 130 is disposed in the sensor cavity 116 and extends into the pumping chamber 64 for measuring a pressure change in the pumping chamber 64 in response to the deformation of the flexible body 46 for generating a signal corresponding to a vibratory frequency of the component. It should be appreciated that more than one sensor 130 could be used, and the sensor(s) 130 could be placed at various locations on the vibrations source, hydraulic mount apparatus 20, or base for measuring various vibration conditions of the vibration source such as displacement, velocity, or acceleration to produce signals that correspond with the vibratory frequency of the vibration source. A plurality of sensor wires 132 extend from the controller 126 to the sensor 130 for electrically connecting the controller 126 and the sensor 130.

The controller 126 defines an electromagnet active operating state for applying a variable positive current through the electromagnet coil 122 for inducing a magnetic flux across the fluid passage for increasing the viscosity of the magnetorheological fluid 70 for increasing the shear resistance of the magnetorheological fluid 70 passing through the main fluid passage 120 to variably increase the damping stiffness of the mount apparatus 20. The controller 126 further defines an electromagnet inactive operating state wherein no current is applied across the main fluid passage 120. The controller activates the electromagnet active and inactive operating states in response to the signal from the at least one sensor 130, generally when the measured vibratory frequency is at the aforementioned relatively low frequencies. However, it should be appreciated that the active and inactive operating states could be activated at any vibratory frequency. Further, it should be appreciated that the electrical current can vary from 0 A (in the inactive operating state) to a maximum value governed by the capability of the power supply 124.

When external excitations cause vibrations to occur at relatively high frequencies, typically above approximately 20 Hz, such as during acceleration of an automobile, fluid is substantially no longer able to flow through the main fluid passage 120. To dampen these relatively high frequency vibrations, the hydraulic mount apparatus 20 includes a moving member 134 at least partially disposed in the pumping chamber 64 and an actuator 136 operatively coupled with the moving member 134 for axially moving the moving member 134 in the pumping chamber 64 for increasing or decreasing the volume of the pumping chamber 64 to maintain the volume of the pumping chamber 64 to prevent a pressure increase in the pumping chamber 64 to cancel the external excitation. It should be appreciated that the moving member 134 and actuator 136 of the present invention are not limited to use on magnetorheological fluid-based mount apparatuses, and could be used on any hydraulic mount apparatus to dampen vibrations at any frequency.

In the enabling embodiment, the moving member 134 extends annularly about and along the first axis A between a moving member upper end 140 and a moving member lower end 142 and defines a moveable wall 144 therebetween made of a flexible material and defines a moving member chamber 151 for flexing radially outwardly and inwardly relative to the first axis A to amplify the volume change in the pumping chamber 64. In other words, the moveable wall 144 increases the surface area of the moving member 134 as compared to the generally piston-shaped moving members of the prior art, therefore displacing more fluid in the pumping chamber during movement of the moving member 134, thus allowing actuators with shorter actuator strokes to be used in the mount apparatus 20. In the enabling embodiment, the actuator 136 is disposed in the moving member chamber 151 and the actuator 136 engages the moving member upper end 140. The moving member upper end 140 is axially moveable relative to the moving member lower end 142 to provide for the flexing of the moveable wall 144. It should be appreciated that in alternate configurations, the moving member lower end 142 could move relative to the moving member upper end 140. It should also be appreciated that the moving member 134 could extend at other angles away from, but close to the first axis A.

In the enabling embodiment, the moving member 134 has a generally hour glass-shape in steady-state for flexing radially outwardly toward a cylindrical-shape in response to relative axial movement between the moving member upper and lower ends 140, 142. However, it should be appreciated that the moving member 134 could have other shapes, so long as the moveable wall 144 is able to move radially outwardly and inwardly in response to movement of the actuator 136. For example, the moveable wall 144 could have a convex-shaped cross-section in steady-state, and the actuator stroke of the actuator 136 would be inverted compared to the enabling embodiment which expands during an actuator stroke axially toward the moving member upper end 140.

In the enabling embodiment, the moveable wall 144 defines a plurality of slits 146 that extend through and axially along the moveable wall 144, and are spaced annularly about the moveable wall 144 for reducing the circumferential strength of the moveable wall 144, therefore reducing the amount of force from the actuator 136 required to move the moveable wall 144 radially outwardly and inwardly, thus advantageously allowing lower-powered actuators to be used on the mount apparatus 20. It should be appreciated that any number of slits 146 could be defined on the moveable wall 144 and they could extend at various orientations for fine tuning the stiffness of the moveable wall 144. Further, a slit seal (not shown) made of a flexible material and having a thickness smaller than the thickness of the moveable wall 144 is sealingly disposed about each of the slits 146 for preventing fluid from flowing through said slits 146. In other words, the slit seal prevents fluid from passing into the moving member chamber 151 while still allowing the slits 146 to provide for reduced circumferential strength of the moveable wall 144.

The moving member lower end 142 defines a moving member passage 154 along the first axis A. The moving member 134 further defines a moving member flange 156 that extends radially outwardly from the moveable wall 144 adjacent the moving member lower end 142. The moving member flange 156 defines a moving member flange upper end 158 that sealingly engaging the lower support member lower end 102.

An actuator support 160 that has a T-shaped cross-section extends annularly about and along the first axis A from an actuator support lower end 161 disposed axially below the moving member passage 154 and through the moving member passage 154 to an actuator support upper end 162 in the moving member chamber 151. It should be appreciated that the actuator support 160 could extend at other angles away from, but close to the first axis A. The actuator support 160 defines an actuator support flange 164 that extends radially outwardly therefrom adjacent the actuator support lower end 161. The actuator support flange 164 defines an actuator support flange upper end 166 that fixedly engages the moving member lower end 142. A ring-shaped actuator support O-ring 168 is disposed annularly about the first axis A between the actuator support flange 164 and the moving member lower end 142 for preventing fluid from the receiving chamber 66 from passing between the actuator support flange 164 and the moving member lower end 142.

The actuator support 160 further defines an actuator support extension ring 170 that extends away from the actuator support lower end 161 along the first axis A. The actuator support 160 further defines an actuator support passage 172 that extends along the first axis A from the actuator support upper end 162, through the actuator support extension ring 170, to the actuator support lower end 161. It should be appreciated that the actuator support 160 and the actuator support passage 172 could extend at other angles away from, but close to the first axis A. The actuator support 160 defines an actuator support passage seat 174 that extends radially into the actuator support passage 172 adjacent the actuator support lower end 161. The diaphragm 58 defines a diaphragm bore 176 that extend through the diaphragm 58 along the first axis A and is sealingly disposed about the actuator support extension ring 170 for preventing fluid from flowing between the diaphragm 58 and the actuator support extension ring 170.

The actuator 136 includes an actuator case 178 that has a generally cylindrical shape and extends annularly about and along the first axis A from an actuator case lower end 179 disposed in the actuator support passage 172 to an actuator case upper end 180 in the moving member chamber 151. The actuator case 178 defines an actuator sloped portion 182 that extends radially inwardly adjacent the actuator case lower end 179 and engages the actuator support passage seat 174 for preventing the actuator 136 from moving axially toward the lower housing portion lower end 26. A ring-shaped actuator O-ring 184 extends annularly about the actuator case 178 axially below the actuator sloped portion 182, and radially between the actuator case 178 and actuator support 160 for sealing the actuator support passage 172.

The moving member upper end 140 defines a moving member seat 186 that extends along the first axis A into the moving member chamber 151 for operative engagement with the actuator 136. The actuator 136 includes an actuator piston 188 that is partially disposed in and slideably extends from the actuator case 178 and is operatively coupled with the moving member seat 186 for moving the moving member upper end 140 to provide for the movement of the move the moveable wall 144.

In the enabling embodiment, the actuator 136 is of the piezostack type. Piezostack actuators, as known in the art, utilize stacks of PZT-ceramics, across which an electric voltage is applied. The thickness of the ceramics increases in the direction of the applied electrical field. These actuators generally have a high force capability and respond predictably at frequencies above 1000 Hz. Therefore, high frequency vibrations can be substantially cancelled with the mount apparatus 20 through movement of the moving member 134 by means of the actuator 136. It should be appreciated that other actuators having a short actuator stroke can be used with the present invention because of the increased surface area of the moving member 134, and further, less powerful actuators can be used because of the slits 146 on the moving member 134.

A plurality of actuator wires 190 extend from inside the actuator case 178, through the actuator case lower end 179, and through the actuator support passage 172 to the controller 126 and to the power supply 124 to electrically connect the actuator 136, the controller 126, and the power supply 124. The controller 126 further controls the movement of the actuator piston 188. Specifically, the controller 126 defines an actuator compressed operating state for moving the actuator piston 188 and the moving member seat 186 axially toward the lower support member lower end 102 for increasing the volume of the pumping chamber 64. The controller 126 further defines an actuator rebounded operating state for moving the actuator piston 188 and the moving member seat 186 axially away from the lower support member lower end 102 for decreasing the volume of the pumping chamber 64. It should be appreciated that the operating states could be changed based on the shape of the moving member 134.

The controller 126 variably activates the actuator compressed and rebounded states in response to the signal from the sensor 130 on the component of the automobile when the measured vibratory frequency is at or above the relatively high frequency vibrations. The controller 126 further activates the actuator compressed and rebounded states 180 degrees out of phase with the vibratory frequency of the component and equal in magnitude to the vibratory magnitude to cancel the transmitted force from the external excitation by keeping fluid pressure variations at a minimum.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A mount apparatus for supporting a vibration source on a base comprising:
   a housing extending about and along a first axis and defining a housing chamber;
   a flexible body made of an elastic material at least partially disposed in said housing chamber to define a pumping chamber configured to be filled with a fluid, said flexible body being interconnected with said housing for deforming elastically in response to movement of the vibration source relative to the housing caused by an external excitation;
   a moving member at least partially disposed in said pumping chamber for moving within said pumping chamber; and
   an actuator operatively coupled to said moving member for moving said moving member to create a volume change in said pumping chamber to maintain the volume of said pumping chamber to prevent a pressure increase in said pumping chamber during said deformation of said flexible body in response to the external excitation to effectively cancel the external excitation,
   wherein said moving member includes an axially extending moveable wall of a flexible material defining a moving member chamber for flexing radially outwardly and inwardly relative to said first axis to amplify the volume change in said pumping chamber, and
   wherein said actuator is a piezostack actuator.

2. The mount apparatus as set forth in claim 1 wherein said moveable wall is configured to extend axially between a moving member upper end and a moving member lower end, at least one of said moving member upper and lower ends being axially moveable relative to one another for said flexing of said moveable wall radially outwardly and inwardly.

3. The mount apparatus as set forth in claim 2 wherein said moving member is of a generally hour-glass shape in steady-state for flexing radially outwardly toward a cylindrical shape in response to said relative axial movement between said moving member upper end and said moving member lower end .

4. The apparatus as set forth in claim 3 and further including a diaphragm made of an elastic material disposed in said housing chamber and spaced axially from said flexible body, and
   a partition assembly disposed in said housing chamber between said flexible body and said diaphragm for dividing said housing chamber into said pumping chamber between said flexible body and said partition assembly and a receiving chamber between said partition assembly and said diaphragm with the volume of each of said chambers being changed by deformation of said flexible body and said diaphragm in response to the external excitation.

5. The mount apparatus as set forth in claim 3 wherein said partition assembly defines a lower support member passage extending therethrough between said pumping chamber and said receiving chamber.

6. The mount apparatus as set forth in claim 5 wherein said moving member is disposed at least partially in said lower support member passage.

7. The mount apparatus as set forth in claim 6 wherein said moving member upper end defines a moving member seat extending into said moving member chamber for being operatively coupled with said actuator.

8. The mount apparatus as set forth in claim 7 wherein said actuator is disposed at least partially in said moving member chamber and operatively coupled with said moving member seat.

9. The mount apparatus as set forth in claim 8 wherein said moving member lower end defines a moving member passage extending therethrough.

10. The mount apparatus as set forth in claim 9 further including an actuator support extending annularly about and along said first axis from an actuator support lower end spaced axially below said moving member passage to an actuator support upper end in said moving member chamber.

11. The mount apparatus as set forth in claim 10 wherein said actuator support defines an actuator support flange extending radially outwardly therefrom adjacent said actuator support lower end and said actuator support flange defines said actuator support upper end sealingly engaging said moving member lower end for preventing fluid from passing between said actuator support flange and said moving member lower end.

12. The mount apparatus as set forth in claim 11 wherein said actuator support defines an actuator support passage extending between said actuator support upper end and said actuator support lower end.

13. The mount apparatus as set forth in claim 12 wherein said actuator support defines an actuator support passage seat extending radially into said actuator support passage adjacent said actuator support lower end.

14. The mount apparatus as set forth in claim 13 wherein said actuator includes an actuator case having a generally cylindrical shape and extending from an actuator case lower end sealingly disposed in said actuator support passage to an actuator case upper end in said moving member chamber.

15. The mount apparatus as set forth in claim 14 wherein said actuator case defines an actuator sloped portion extending radially inwardly adjacent said actuator case lower end and engaging said actuator support passage seat for preventing said actuator from moving axially toward a lower housing portion lower end of said housing.

16. The mount apparatus as set forth in claim 15 further including an actuator piston slideably disposed in and extending from said actuator and operatively coupled with said moving member seat for axially moving said moving member seat.

17. The mount apparatus as set forth in claim 1 wherein said moveable wall defines at least one slit extending through and along said moveable wall for reducing the circumferential strength of said moveable wall to reduce the amount of force required to flex said moveable wall radially outwardly.

18. The mount apparatus as set forth in claim 17 further including a slit seal made of flexible material and having a thickness smaller than the thickness of said moveable wall sealingly disposed about each of said slits for preventing fluid from flowing through said slits.

19. The mount apparatus as set forth in claim 18 wherein said at least one slit comprises a plurality of slits extending axially along and spaced annularly about said moveable wall.

20. The mount apparatus as set forth in claim 1 wherein the vibration source is a component of an automobile and the base is the frame of the automobile.

21. The mount apparatus as set forth in claim 1 further including a sensor for measuring a vibration condition of the vibration source and for generating a signal corresponding to a vibratory frequency, and a controller for controlling the movement of said actuator in response to said signal from said sensor.

* * * * *